(12) United States Patent
Ichikawa (10) Patent No.: US 11,283,783 B2
(45) Date of Patent: Mar. 22, 2022

(54) NON-TRANSITORY COMPUTER READABLE MEDIUM AND INFORMATION PROCESSING APPARATUS

(71) Applicant: FUJIFILM BUSINESS INNOVATION CORP., Tokyo (JP)

(72) Inventor: Takehiro Ichikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 61 days.

(21) Appl. No.: 16/515,205

(22) Filed: Jul. 18, 2019

(65) Prior Publication Data

US 2019/0342273 A1     Nov. 7, 2019

Related U.S. Application Data

(63) Continuation of application No. 15/591,410, filed on May 10, 2017, now Pat. No. 10,404,673.

(30) Foreign Application Priority Data

Aug. 16, 2016   (JP) ................................ 2016-159634

(51) Int. Cl.
    *H04L 29/06*      (2006.01)
    *G06F 21/31*      (2013.01)

(52) U.S. Cl.
    CPC .............. *H04L 63/06* (2013.01); *G06F 21/31* (2013.01); *H04L 63/08* (2013.01); *G06F 2221/2103* (2013.01)

(58) Field of Classification Search
CPC ... H04L 63/06; G06F 21/31; G06F 2221/2103
See application file for complete search history.

(56) References Cited

U.S. PATENT DOCUMENTS

| 8,997,240 B1 * | 3/2015 | Kohen ................... G06F 21/31 726/26 |
| 9,135,315 B2 * | 9/2015 | Barbas ................. G06F 16/248 |

(Continued)

FOREIGN PATENT DOCUMENTS

| EP | 2 410 450 A1 | 1/2012 |
| JP | 2008-269381 A | 11/2008 |
| JP | 2012-014292 A | 1/2012 |

OTHER PUBLICATIONS

Mar. 31, 2020 Office Action issued in Japanese Application No. 2016-159634.

*Primary Examiner* — Mohammed Waliullah (74) *Attorney, Agent, or Firm* — Oliff PLC (57) ABSTRACT

A non-transitory computer readable medium stores a program causing a computer to execute a process that includes, for example, receiving an entry of information from a requesting user who has requested a clue about user information, specifying, from registered users, at least one candidate corresponding to the requesting user in accordance with the received entry of information, and controlling a display to display, on a same screen, (i) user information of the specified at least one candidate that is partially masked and (ii) a button for calling up an authentication screen. The authentication screen is a screen on which a password corresponding to the user information of the specified at least one candidate is entered.

9 Claims, 6 Drawing Sheets

(56) References Cited

U.S. PATENT DOCUMENTS

| | | | |
|---|---|---|---|
| 2007/0061865 A1* | 3/2007 | Bermudez | G06F 21/40 726/2 |
| 2011/0113050 A1* | 5/2011 | Youn | G06F 21/6218 707/757 |
| 2013/0132178 A1* | 5/2013 | Masuko | G06Q 30/0217 705/14.19 |
| 2015/0199505 A1* | 7/2015 | Jo | G06F 21/60 726/4 |
| 2015/0356146 A1* | 12/2015 | Yamashita | G06F 16/24575 707/722 |
| 2016/0148075 A1* | 5/2016 | Barreau | G06K 9/3275 382/115 |
| 2018/0054424 A1* | 2/2018 | Ichikawa | H04L 63/08 |

* cited by examiner

LINKED SYSTEM MANAGEMENT TABLE

| SYSTEM ID | SYSTEM NAME |
|---|---|
| system1 | PURCHASE MANAGEMENT SYSTEM A |
| system2 | DOCUMENT MANAGEMENT SYSTEM A |
| system3 | DOCUMENT MANAGEMENT SYSTEM B |

FIG. 3

USER MANAGEMENT TABLE

| USER ID IN LINKED SYSTEM | COMMON USER ID | LINKED SYSTEM ID |
|---|---|---|
| 54321 | 00001 | system1 |
| takehiro | 00001 | system2 |
| ichikawa | 00001 | system3 |
| 12345 | 00002 | system1 |
| Fuji | 00002 | system2 |
| Taro | 00002 | system3 |

FIG. 4

| OPERATION TYPE MANAGEMENT TABLE | | |
|---|---|---|
| OPERATION TYPE ID | OPERATION NAME IN system1 | ..... |
| category1 | REGISTRATION | ..... |
| category2 | PURCHASE | ..... |
| category3 | VIEW | ..... |
| category4 | ACQUISITION | ..... |

FIG. 5

| USER ID: 00001 | |
|---|---|
| LINKED SYSTEM ID | RECORDED OPERATION |
| system1 | REGISTRATION, PURCHASE, VIEW |
| system2 | REGISTRATION, VIEW, ACQUISITION |
| system4 | REGISTRATION, VIEW, ACQUISITION |

FIG. 6

OPERATION HISTORY TABLE

| COMMON USER ID | OPERATION TYPE ID | TIME AND DATE OF OPERATION | LINKED SYSTEM ID | OPERATION TARGET |
|---|---|---|---|---|
| 00001 | category1 | DECEMBER 10, 2015 15:38:00 | system2 | sample.docx |
| 00001 | category4 | DECEMBER 10, 2015 15:43:20 | system2 | COMPARISON TABLE.xlsx |
| 00002 | category2 | JANUARY 13, 2016 12:13:25 | system1 | PC MEMORY (2 GB) |
| 00003 | category1 | MAY 11, 2014 17:38:01 | system3 | SPECIFICATION 1.doc |
| 00003 | category1 | MAY 11, 2014 17:38:05 | system3 | SPECIFICATION 2.doc |
| 00003 | category1 | MAY 11, 2014 17:38:11 | system3 | SPECIFICATION 3.doc |
| 00003 | category1 | MAY 11, 2014 17:38:15 | system3 | SPECIFICATION 4.doc |
| 00004 | category4 | FEBRUARY 1, 2016 12:11:13 | system1 | |

ENTER INFORMATION YOU CAN ANSWER ABOUT OPERATION YOU PERFORMED IN PAST IN TARGET SYSTEM

DATE OF PAST OPERATION — DATE (REQUIRED) [DECEMBER 15, 2015] ~502
ABOUT — TIME (OPTIONAL) [ ] ~504
OPERATION YOU PERFORMED — [PURCHASE ▼] ~506
OPERATION TARGET — [MEMORY 2 GB] ~508

510 — [SEND ANSWER]

FIG. 9

FOLLOWING CANDIDATES OF YOUR USER ID HAVE BEEN FOUND.

USER ID CANDIDATES
1. ●●k●hi●●
2. t●●a●as●● ~602

604 — [RETURN TO AUTHENTICATION SCREEN]

NON-TRANSITORY COMPUTER READABLE MEDIUM AND INFORMATION PROCESSING APPARATUS

CROSS-REFERENCE TO RELATED APPLICATIONS

This application is a continuation of U.S. patent application Ser. No. 15/591,410, filed May 10, 2017, which claims the benefit of Japanese Patent Application No. 2016-159634, filed Aug. 16, 2016. The entire contents of these documents are hereby incorporated by reference.

BACKGROUND

(i) Technical Field

The present invention relates to a non-transitory computer readable medium and an information processing apparatus.

(ii) Related Art

It is known that a user registers beforehand a secret question and an answer to the secret question in a system in association with a user ID and a password, and the system presents the secret question to the user in a case where the user cannot log in the system. The system offers a screen for password reset in a case where the user gives a correct answer to the question. The system does not work this way in a case where the user enters an incorrect user ID.

Furthermore, it is known that in a case where a user forgets a user ID or a password and cannot log in a system, the system sends the user ID of the user to an e-mail address of the user that is registered in advance, thereby prompting the user to reset the password.

SUMMARY

For example, in a case where a user registers different user IDs in plural systems, it is highly likely that the user forgets the user IDs and passwords. However, if the user can recall a user ID, there are quite a few chances for the user to recall a corresponding password. Therefore, if a clue about the user ID can be offered to the user, it becomes more likely that the user is successfully authenticated.

In order to give a clue about user information to a user, it is necessary for a system to narrow down who this user is to some extent. One method to narrow down who the user is to ask the user to enter personal information of the user, such as an e-mail address and a date of birth, that is registered in advance.

According to an aspect of the invention, there is provided a non-transitory computer readable medium storing a program causing a computer to execute a process for information processing, the process including: acquiring operation histories of registered users from a system; presenting a question about an operation history in the system to a requesting user who has requested a clue about user information and receiving entry of an answer to the question; and specifying, from the registered users, a candidate corresponding to the requesting user in accordance with a degree of matching of the received answer from the requesting user with the acquired operation histories of the registered users and then offering a clue about user information of the specified candidate to the requesting user.

BRIEF DESCRIPTION OF THE DRAWINGS

An exemplary embodiment of the present invention will be described in detail based on the following figures, wherein.

DETAILED DESCRIPTION

Figure 1:
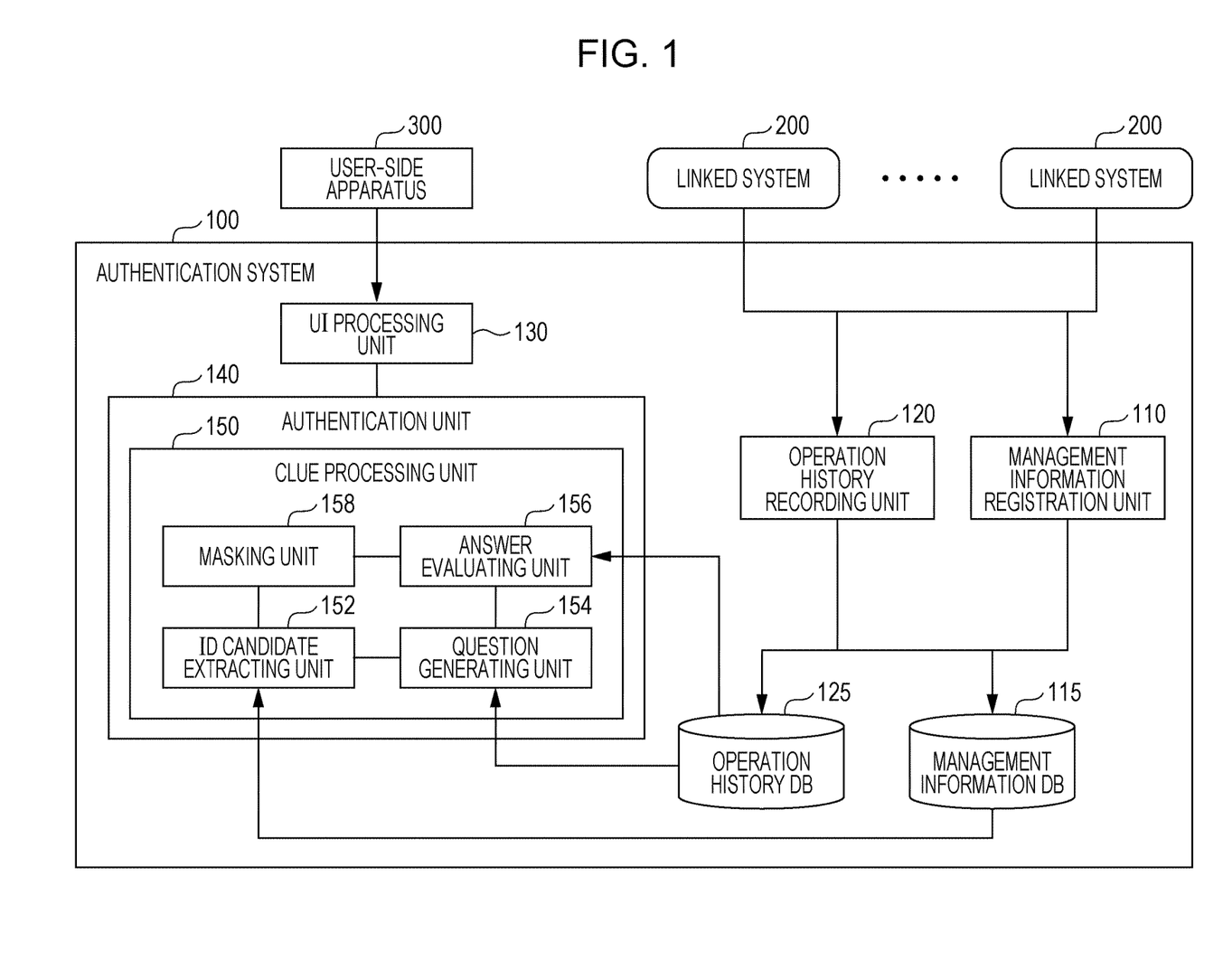
FIG. 1 illustrates an example of a system configuration of an exemplary embodiment.

An example of a system to which a method of the present exemplary embodiment is applied is described below with reference to FIG. 1.

An authentication system 100 is a system that offers an authentication service to plural linked systems 200 and has an ID (identification information) clue offering function of the present exemplary embodiment. The ID clue offering function is a function of offering a clue about a user ID. Specifically, this function is a function of asking a user a question concerning an operation history in a linked system 200 and giving a clue about a user ID to the user in accordance with a degree of matching of a user's answer to the question with an operation history corresponding to the user ID.

Each of the linked systems 200 is a system that offers an information processing service to users, for example, online. Each of the linked systems 200 is linked to the authentication system 100 regarding user authentication for allowing the users to use the service and entrusts user authentication to the authentication system 100. In one example (not limited to this example), pairs of user ID and password of users that are registered in the linked systems 200 are registered in the authentication system 100, and the authentication system 100 authenticates users who try to use the linked systems 200 by using the registered information. Services offered by the linked systems 200 are not directly related to the method of the present exemplary embodiment and are not limited in particular.

A user-side apparatus 300 is an apparatus that is operated by a user to use the linked systems 200 over a network such as the Internet or an intranet. The user-side apparatus 300 is, for example, a personal computer, a smartphone, a multi-function printer, or a kiosk terminal.

A management information registration unit 110 of the authentication system 100 collects management information for the ID clue offering function of the present exemplary embodiment from the linked systems 200 and registered the collected management information in a management information database (DB) 115 and an operation history DB 125.

Figure 2:
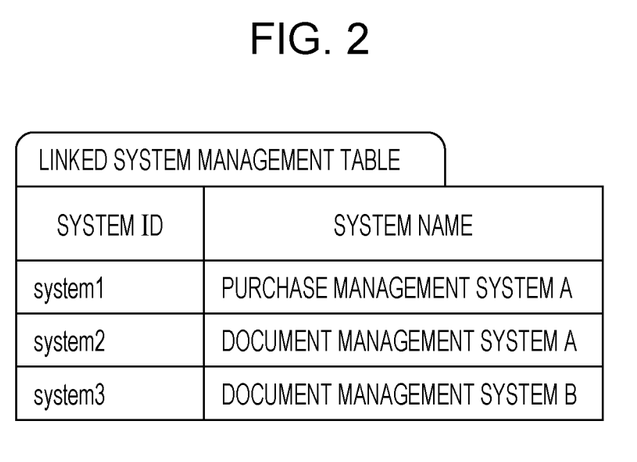
FIG. 2 illustrates an example of a linked system management table.
Figure 3:
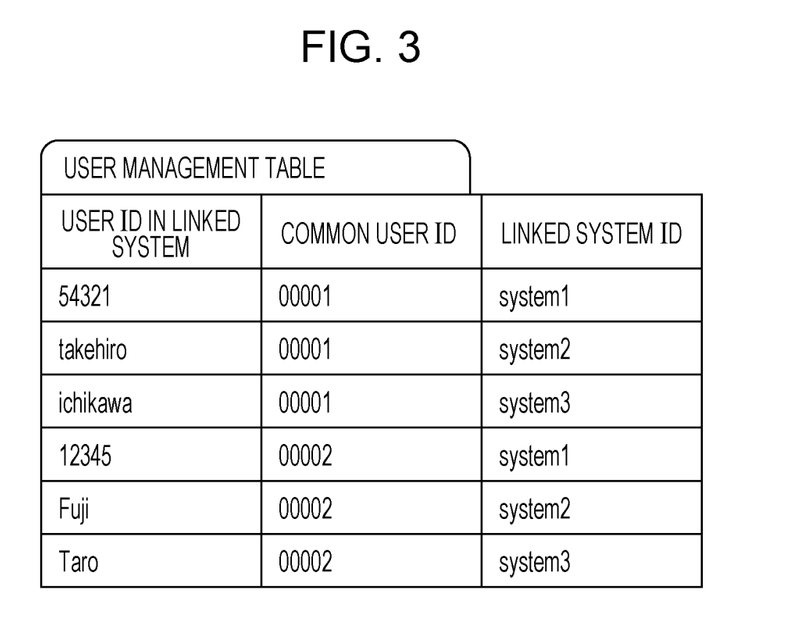
FIG. 3 illustrates an example of a user management table.

A linked system management table illustrated in FIG. 2 and a user management table illustrated in FIG. 3 are held in the management information DB 115.

In the linked system management table illustrated in FIG. 2, system names of the respective linked systems 200 are registered so as to be associated with system IDs uniquely given to the respective linked systems 200 by the authentication system 100. In addition, information, such as URLs of the respective linked systems 200, necessary for exchange of information for control of the present exemplary embodiment between the authentication system 100 and the linked systems 200 may be registered. These pieces of information are registered in the linked system management table, for example, by an administrator of the authentication system 100 by using the management information registration unit 110 when the administrator registers the linked systems 200 in the authentication system 100.

In the user management table illustrated in FIG. 3, common user IDs of users and system IDs of the linked systems 200 in which the users use user IDs are registered so as to be associated with the user IDs registered in the linked systems 200 by the users. The common user IDs are unique user IDs given to the respective users by the authentication system 100. In the example illustrated in FIG. 3, a user who has a common user ID "00001" uses, as user IDs, "54321", "takehiro", and "ichikawa" in linked systems "system1", "system2", and "system3", respectively. For example, users themselves need just log in the authentication system 100 and register the user IDs of the linked systems 200 in the user management table by using the management information registration unit 110.

Figure 4:
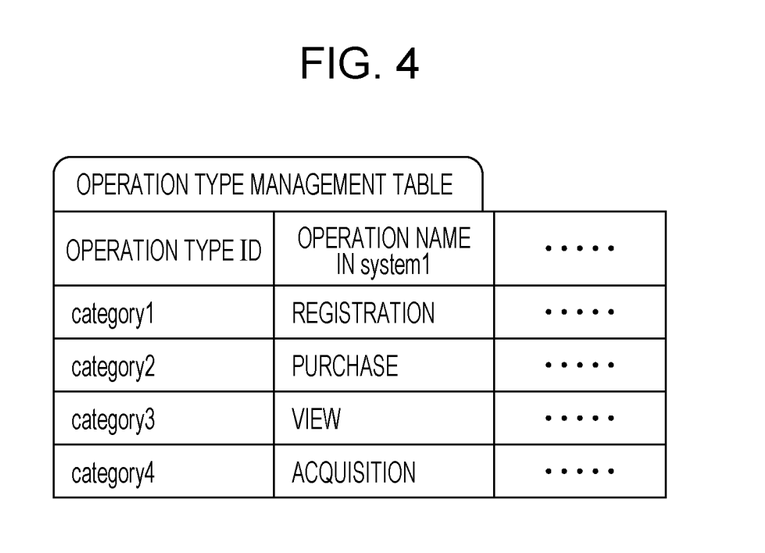
FIG. 4 illustrates an example of an operation type management table.
Figure 5:
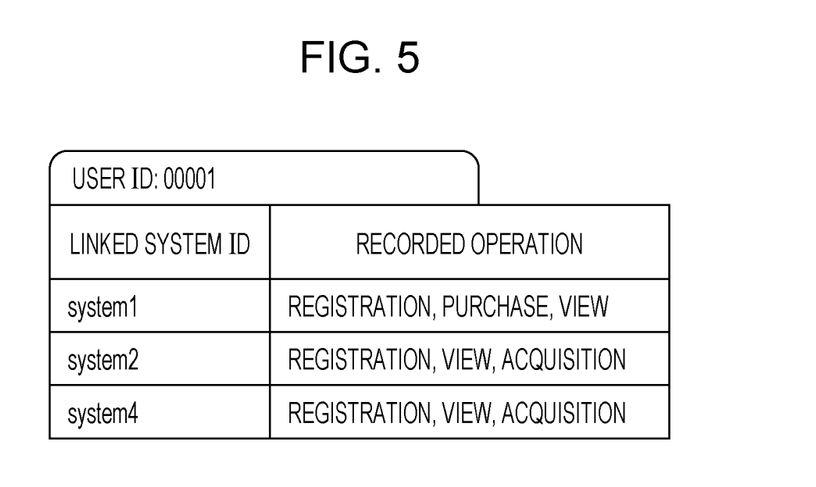
FIG. 5 illustrates an example of a recorded item management table for each user.
Figure 6:
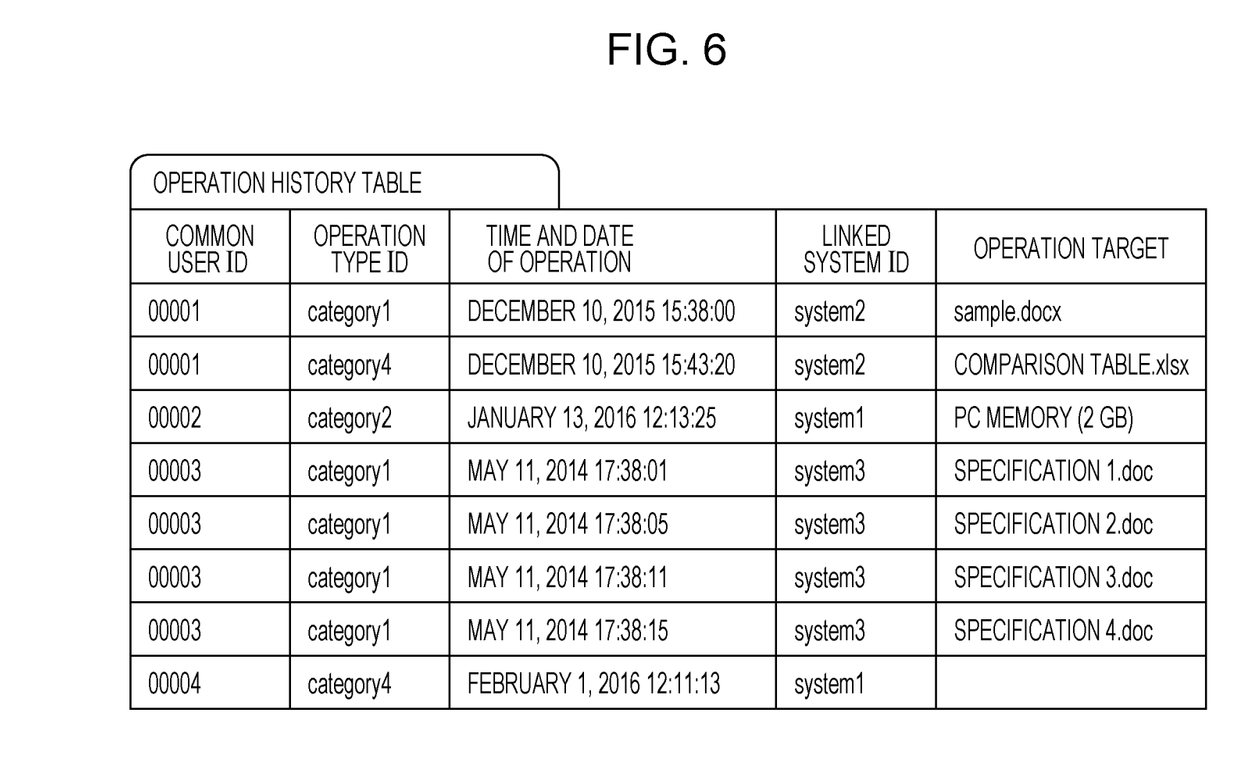
FIG. 6 illustrates an example of an operation history table.

An operation type management table illustrated in FIG. 4, a recorded item management table for each user illustrated in FIG. 5, and an operation history table illustrated in FIG. 6 are held in the operation history DB 125.

In the operation type management table illustrated in FIG. 4, identification information (operation names) of operations corresponding to operation types in each of the linked systems 200 is registered so as to be associated with identification information (operation type IDs) of the operation types. For example, an operation in the linked system "system1" that corresponds to an operation type "category1" is "PURCHASE". Although only operation names in the linked system "system1" are illustrated in FIG. 4, operation names corresponding to operation types in other linked systems are also registered in the operation type management table. Thanks to this table, operations of the same type that are managed as different operation names in different linked systems 200 are recognized as operations of the same type in the authentication system 100 (especially a clue processing unit 105). The information in the operation type management table is registered, for example, by the administrator of the authentication system 100 by using the management information registration unit 110 when the administrator registers the linked systems 200 in the authentication system 100.

The recorded item management table illustrated in FIG. 5 is a table in which a user sets which operation in which linked system 200 is recorded as a history in the operation history DB 125. In the example of FIG. 5, a recorded item management table for the user having the user ID "00001" is illustrated. In this example, operations "REGISTRATION", "PURCHASE", and "VIEW" performed in the "system1" are recorded, and "REGISTRATION", "VIEW", and "ACQUISITION" performed in the "system2" and the "system3" are recorded for this user. Such a recorded item management table is registered for each user. Which operation in the linked systems 200 is recorded may be, for example, set by a user himself or herself.

The operation history table illustrated in FIG. 6 is a table in which information on operation histories of operations performed in the linked systems 200 by users are held. In the example illustrated in FIG. 6, an operation history of an individual operation includes a common user ID of a user who performed the operation, an operation type ID corresponding to the operation, time and date of the operation, a system ID of a linked system 200 in which the operation was performed, and a name of a target of the operation ("OPERATION TARGET"). For example, an uppermost operation history in the table illustrated in FIG. 6 indicates that a common user ID "00001" performed an operation ('REGISTRATION') of "category1" on a document "sample.docx" in a linked system "system2" ("DOCUMENT MANAGEMENT SERVICE A") at 15:38:0 on Dec. 10, 2015. In addition to the common user ID, a user ID (not illustrated in FIG. 6) used in the linked system 200 in which the operation was performed may be registered in the operation history table.

See FIG. 1 again. An operation history recording unit 120 registers, in the operation history table included in the operation history DB 125, operation histories of operations performed by users in the linked systems 200. A timing at which an operation history is recorded is not limited in particular. For example, every time a user performs an operation in a linked system 200, history information of the operation may be transmitted to the operation history recording unit 120 by the linked system 200 so as to be recorded in the operation history DB 125. Alternatively, the operation history recording unit 120 may regularly (e.g., at a fixed time on each day) collect a group of history information of operations performed after a previous collection time from the linked systems 200 and record the collected group of history information in the operation history DB 125.

Upon receipt of history information of an operation from a linked system 200, the operation history recording unit 120 finds, from the linked system management table (FIG. 2), a system ID corresponding to a name of the linked system 200 that transmitted the history information. Furthermore, the operation history recording unit 120 finds, from the user management table (FIG. 3), a common user ID corresponding to a user ID of an operator included in the history information. Then, the operation history recording unit 120 determines, from a recorded item management table (FIG. 5) corresponding to the user ID, whether or not an operation name included in the history information is an operation to be recorded for the user. In a case where the operation name included in the history information is not an operation to be recorded, an operation history of this operation is not recorded in the operation history table. In a case where the operation name included in the history information is an operation to be recorded, the operation history recording unit 120 finds an operation type ID corresponding to the operation name from the operation type management table (FIG. 4), generates an operation history record including the common user ID, operation type ID, and system ID of the linked system thus found, and time and date of the operation and an operation target that are included in the history information, and then records the operation history record in the operation history table.

A UI processing unit 130 offers a user interface (UI) screen for an operation of the authentication system 100 to a user who operates the user-side apparatus 300 and receives a user's operation on the UI screen.

An authentication unit 140 performs a user authentication process on a user who requested use of a linked system 200. The authentication unit 140 requests the user to enter his or her authentication information (a pair of user ID and password) for the linked system 200 and determines whether or not the authentication information entered by the user in response to this request matches his or her authentication information for the linked system 200 registered in the authentication unit 140. In a case where these pieces of authentication information match each other, the authentication unit 140 determines that the user has been successfully authenticated and permits the user to use the linked system 200. Meanwhile, in a case where these pieces of authentication information do not match each other, the authentication unit 140 determines that authentication has failed.

In a case where authentication has failed, the clue processing unit 150 operates automatically or when the user asks for clue information. The clue processing unit 150 offers a clue about a user ID to a user who has failed in authentication. In a case where authentication has failed, at least one of user ID and password is wrong. The clue processing unit 150 considers a case where the user ID is wrong and offers a clue about the user ID. In a case where a user is registered in plural linked systems 200, the user can rarely use the same user ID in the plural linked systems 200 and, for example, tends to forget a user ID registered in a linked system 200 that is less frequently used. If the correct user ID is found, the user can recall a corresponding password in many cases. That is, it becomes more likely that the user need not perform a troublesome operation such as resetting of the password.

The clue processing unit 150 determines to which user ID the user is likely to correspond on the basis of a group of operation histories held in the operation history DB 125 and offers a clue about the user ID thus found to the user.

The clue processing unit 150 includes an ID candidate extracting unit 152, a question generating unit 154, an answer evaluating unit 156, and a masking unit 158.

The ID candidate extracting unit 152 extracts candidates of a correct user ID of a user who has failed in authentication (hereinafter referred to as a "target user") from the user management table (FIG. 3) of the management information DB 115. The extracted candidates include, for example, the following:

(1) A user ID (hereinafter referred to as an "entered ID") entered by the target user in failed authentication. The entered ID need not be extracted as a candidate in a case where no user ID that matches a character string of the entered ID is found in "USER ID IN LINKED SYSTEM" of the user management table.

(2) Other user IDs that correspond to a common user ID corresponding to the entered ID. For example, in a case where the entered ID is "takehiro" in the example of FIG. 3, "54321" and "ichikawa" are other user IDs that correspond to the common user ID "00001" that is the same as the entered ID, and these user IDs are extracted as candidates according to this criterion (2). In a case where no user ID that matches a character string of the entered ID is found in "USER ID IN LINKED SYSTEM" of the user management table, it is unnecessary to extract a candidate according to this criterion (2).

(3) A user ID that has a similar character string to the entered ID among user IDs in "USER ID IN LINKED SYSTEM" of the user management table. A lot of algorithms for determining a degree of similarity between two character strings have been conventionally proposed. One example of such an algorithm is a Levenshtein distance. The ID candidate extracting unit 152 finds index values (e.g., Levenshtein distances) of degrees of similarity of the user IDs in "USER ID IN LINKED SYSTEM" of the user management table with the entered ID by using such an algorithm. The ID candidate extracting unit 152 extracts a user ID having a degree of similarity that is equal to or larger than a threshold value (having a Levenshtein distance that is equal to or longer than a threshold value in the case of Levenshtein distance) as a candidate according to the criterion (3).

(4) A user ID that shares the same common user ID with the candidate extracted according to the criterion (3) among the user IDs in "USER ID IN LINKED SYSTEM" of the user management table. For example, assume that the entered ID is "Fiji" in the example of FIG. 3 and that "Fuji" similar to this is extracted as a candidate according to the criterion (3). In this case, "12345" and "Taro", which correspond to the same common user ID "00002" as "Fuji", are extracted as candidates according to the criterion (4).

The ID candidate extracting unit 152 may limit an extracted candidate ID to a user ID registered in a linked system 200 (hereinafter referred to as a "target system") in which the target user failed in authentication trying to log in.

The question generating unit 154 generates a question concerning an operation history to be given to a target user. The question generating unit 154 may generate a single question, but it is anticipated that the user can be more accurately specified in a case where the question generating unit 154 generates plural questions. The question generating unit 154 may generate, for example, questions about time and date of a latest operation, the type of the operation, and an operation target. The question generating unit 154 may generate a question by using information in any item recorded in the operation history table (FIG. 6). The format of the question is not limited in particular and can be any format such as a multiple-choice question or a description-type question. The range of the question may be limited to an operation history in the linked system 200 in which authentication has failed or may be widened to operation histories in all of the linked systems 200. The question generating unit 154 may give a fixed question that is prepared in advance to the target user or may adjust contents of the question in accordance with a candidate user ID (hereinafter referred to as a "candidate ID") extracted by the ID candidate extracting unit 152. For example, in a case where a multiple-choice question is given, a value of a history item related to the question in an operation history corresponding to the candidate ID is incorporated as one option. Specifically, for example, in a case where a target user failed in authentication in the linked system "system2" and where the ID candidate extracting unit 152 extracts "Fuji" as a candidate ID, the name of the last product which "Fuji" purchased in "system2" is included as one of options of a question about a recent product purchased in the linked system "system2".

A group of questions generated by the question generating unit 154 is supplied, for example, in the form of a web page to the user-side apparatus 300 of the target user through the UI processing unit 130. The user enters answers to the group of questions in answer entry fields of the web page and returns an answer result to the UI processing unit 130.

The answer evaluating unit 156 calculates a degree of matching (hereinafter referred to as a "matching degree" with the target user) of each candidate ID with the target user on the basis of an answer of the target user to a question of the question generating unit 154. An example of calculation of the matching degree will be described later.

The matching degree calculated for each candidate ID is supplied to the masking unit 158.

The masking unit 158 performs masking processing on a character string of each candidate ID presented to the user in accordance with a matching degree of the candidate ID received from the answer evaluating unit 156. The masking processing is processing for masking a character(s) of a character string of a candidate ID (for example, replacing the character into a symbol indicating a blackened part). The masking unit 158 masks a smaller number of characters in a candidate ID having a higher matching degree with the target user. The masking unit 158 may exclude a candidate ID having a too low matching degree (i.e., a matching degree that is equal to or lower than a predetermined screening threshold value) from candidate IDs presented to the user.

The clue processing unit 150 presents a list of masked candidate IDs generated by the masking unit 158 to the target user as a clue.

Figure 7:
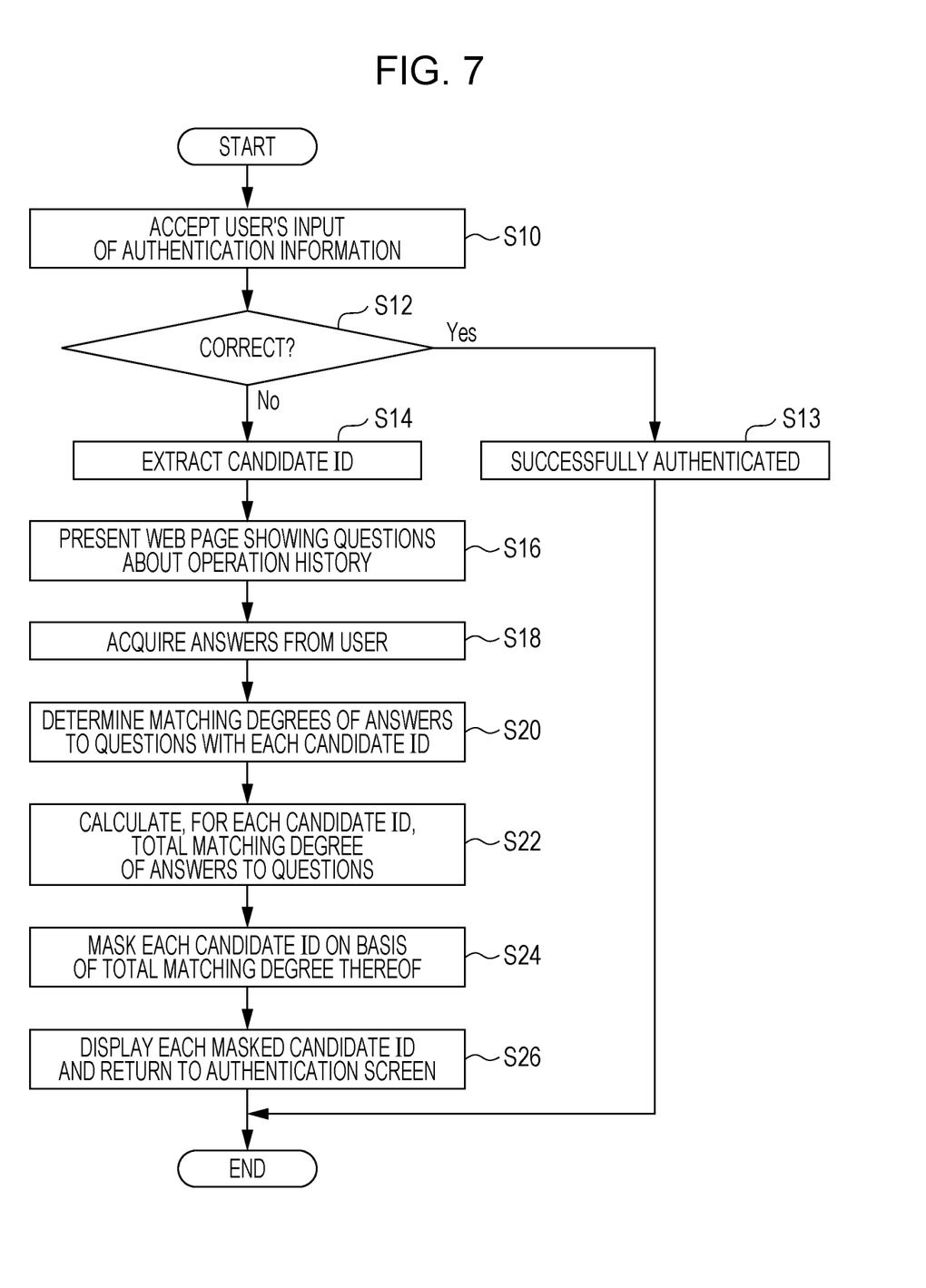
FIG. 7 illustrates an example of a processing procedure of an authentication system.

Next, an example of a processing procedure of the authentication system 100 is described with reference to FIG. 7. In this procedure, first, the authentication unit 140 receives, from a target user, designation of a linked system 200 which the user is trying to log in and entry of authentication information (pair of user ID and password) of the user in the linked system 200 (S10). Then, the authentication unit 140 determines whether or not the pair of user ID and password is correct, i.e., whether or not the pair matches any of pairs of user ID and password registered in the linked system 200 (S12). In a case where the pair of user ID and password is correct, the authentication unit 140 permits user's login to the linked system 200 (S13) and finishes the processing.

In a case where a result of the determination in S12 indicates NO (failed authentication), the clue processing unit 150 starts processing in this example. In this case, the ID candidate extracting unit 152 extracts a candidate ID in accordance with one or more of the criteria illustrated above on the basis of the user ID entered in S10 (S14). Next, the question generating unit 154 presents a web page showing a question concerning an operation history to the user-side apparatus 300 of the target user through the UI processing unit 130 (S16).

Figure 8:
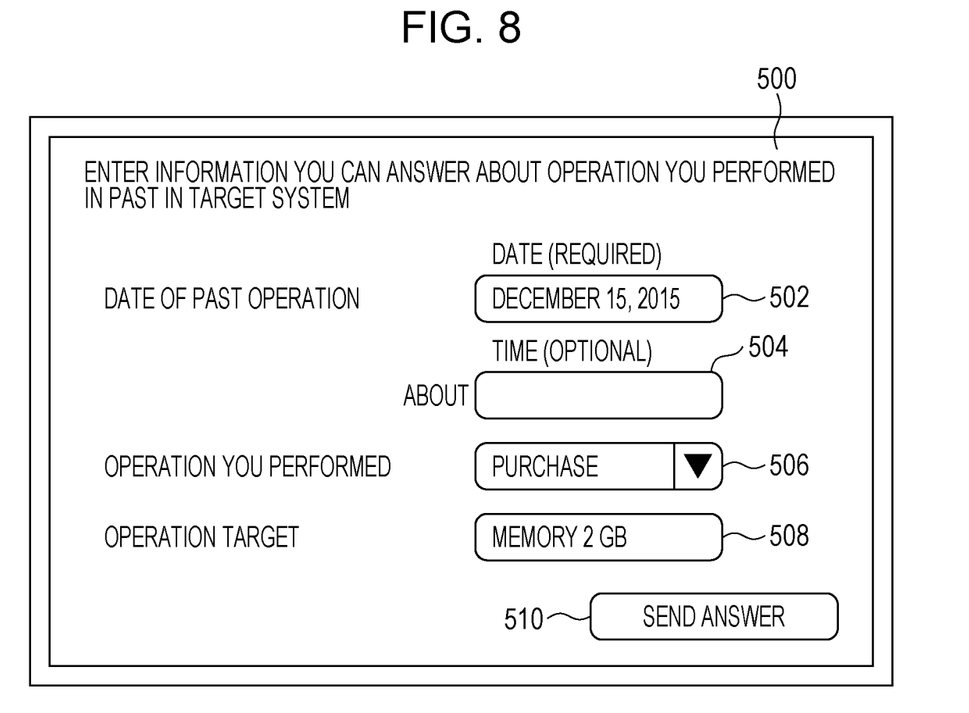
FIG. 8 illustrates an example of a web page for questions.

FIG. 8 illustrates an example of a web page 500 for questions. The web page 500 asks three items concerning an operation previously performed by a target user in a linked system 200 ("target system") in which the target user has failed in authentication, i.e., a date of the operation, the name of the operation, and an operation target. The web page 500 includes, as answer entry fields, a date entry field 502, a time entry field 504, an operation name entry field 506, and an operation target entry field 508.

In the date entry field 502, the target user enters year, month, and day on which the target user performed one of the operations performed previously in the target system.

The target user may call up a calendar by pressing a calendar call-up button adjacent to the date entry field 502 and select a specific day from the calendar so that the selected date is entered in the date entry field 502. In this example, the date of the operation is designated as a required item. In the time entry field 504, the target user enters an approximate time at which the operation was performed. The time is an optional item.

In the operation name entry field 506, the target user enters an operation name of the operation performed on the date entered in the date entry field 502. In the example illustrated in FIG. 8, in the operation name entry field 506, options of an operation available in the target system are presented in the form of a pull-down menu, and the user selects an operation which the user performed from among the options. In the example illustrated in FIG. 8, an operation name "PURCHASE" is entered.

In the operation target entry field 508, the target user enters an operation target of the operation entered in the operation name entry field 506. The target user enters, for example, a character string indicative of the name of the operation target by using a keyboard. In the example illustrated in FIG. 8, a character string "MEMORY 2 GB" is entered.

The target user presses an answer send button 510 after entering as many answers as possible in the entry fields of the web page 500 displayed on a screen of the user-side apparatus 300. As a result, the answers to the question items, i.e., the date of the operation, the name of the operation, and the operation target are transmitted from the user-side apparatus 300 to the clue processing unit 150 of the authentication system 100.

See FIG. 7 again. Upon receipt of answers to the questions presented in S16 from the target user (S18), the answer evaluating unit 156 determines a degree of matching (matching degree) of the answers to the questions with an operation history of each candidate ID (S20). Then, the answer evaluating unit 156 finds, for each candidate ID, a total score by summing up scores of matching degrees of the answers to the questions (S22).

This is described below by taking the group of questions of the web page 500 illustrated in FIG. 8 as an example. First, the answer evaluating unit 156 determines, for each candidate ID, whether or not an operation was performed by an operator corresponding to the candidate ID on the operation date entered by the user by referring to the operation history table (see FIG. 6). That is, the answer evaluating unit 156 determines whether or not the operation history table includes an operation history record (hereinafter referred to as a "candidate record") that has, in the "COMMON USER ID" column, a common user ID corresponding to the candidate ID, has, in "TIME AND DATE OF OPERATION", a date that matches the operation date entered by the user, and has, in "LINKED SYSTEM ID", a system ID that matches the system ID of the target system. A candidate ID for which a candidate record is found gets a predetermined matching degree score given in a case where the operation date is correct. A candidate ID for which no candidate record is found cannot get this score. Even in a case where the answered operation date does not match a date of "TIME AND DATE OF OPERATION", a score lower than a score obtained in a case where the answered operation date is correct may be given to the candidate ID as long as the answered operation date is close to the date of "TIME AND DATE OF OPERATION". For example, a score that is half of the score obtained in a case where the answered operation date is correct may be given to the candidate ID in a case where a difference between the answered operation date and the date of "TIME AND DATE OF OPERATION" is one day.

There are cases where plural candidate records having a matching combination of user, linked system, and date are found. In such cases, a matching degree score is found for each of the candidate records. That is, a single candidate ID has plural candidate records, and a matching degree score is given to each of the candidate records. A matching degree score is added to each of the plural candidate records depending on an answer to a succeeding question. Finally, a highest one of the scores of the plural candidate records is used as a matching degree score of the candidate ID.

In a case where the target user further answers an operation time on the web page 500, a score may be added to a matching degree score for the operation date depending on the answered time. A higher score is added as the answered time is closer to the time of "TIME AND DATE OF OPERATION" of the candidate record.

In the example of FIG. 8, a question about a date of an operation is given. However, in a case where a user cannot answer a correct date, the user may be allowed to answer a period in which the operation was performed (e.g., the operation was performed in "the second week of December"). In a case where the answered period is correct (e.g., the answer is "the second week of December" while a date of an operation in a candidate record is December 8), a predetermined matching degree score that is lower than that given in a case where the user answers a correct date is given.

Next, the answer evaluating unit 156 evaluates an answer about a performed operation. That is, the answer evaluating unit 156 examines each candidate record of each candidate ID and adds a predetermined score to a matching degree score of a candidate record including an operation type ID corresponding to an answered operation name.

Then, the answer evaluating unit 156 evaluates an answer about an operation target. That is, the answer evaluating unit 156 examines each candidate record of each candidate ID and adds a score to a matching degree score of a candidate record including an operation target that matches an answered operation target. The answer evaluating unit 156 may add a score only in a case where the operation target included in the candidate record perfectly matches the answered operation target or may add a score that depends on a degree of similarity between the operation target included in the candidate record and the answered operation target even in a case where the operation target included in the candidate record does not perfectly match the answered operation target. In the example of FIG. 8, an answer to the question about an operation target is not given by selecting an option, but given by freely describing the answer. Therefore, matching or a degree of similarity between the answered operation target and an operation target included in each candidate record may be determined by using a natural language recognition technique.

In this way, a total score of a matching degree for each candidate record is found by evaluating all answers. Different scores may be allocated to different questions depending on the importance thereof although this is not mentioned above in particular. For example, in a case where an operation target is given the highest importance among an operation date, an operation type, and the operation target, a score added to a candidate record having an operation target that matches an answered operation target is made larger than that added in a case where the candidate record has matching time and date of operation or in a case where the candidate record has a matching operation type.

Then, the answer evaluating unit 156 determines, for each candidate ID, that the highest one of the total scores of matching degrees of candidate records of the candidate ID is a matching degree of the candidate ID.

See the procedure of FIG. 7 again. The answer evaluating unit 156 supplies a matching degree of each candidate ID to the masking unit 158. The masking unit 158 masks a character(s) of a character string of each candidate ID in accordance with a matching degree of the candidate ID (S24). The masking unit 158 determines the number of characters to be masked in the character string of the candidate ID in accordance with the rule that the percentage of masked characters is made low as the matching degree becomes higher, and masks the determined number of characters in the character string of the candidate ID, for example, randomly. The masking unit 158 may exclude, from candidate IDs to be presented, a candidate ID having a matching degree that is equal to or lower than a screening threshold value.

The clue processing unit 150 generates a clue screen on which candidate IDs masked by the masking unit 158 are displayed as a list, for example, in the form of a web page and supplies the clue screen to the user-side apparatus 300 of the target user through the UI processing unit 130 (S26).

Figure 9:
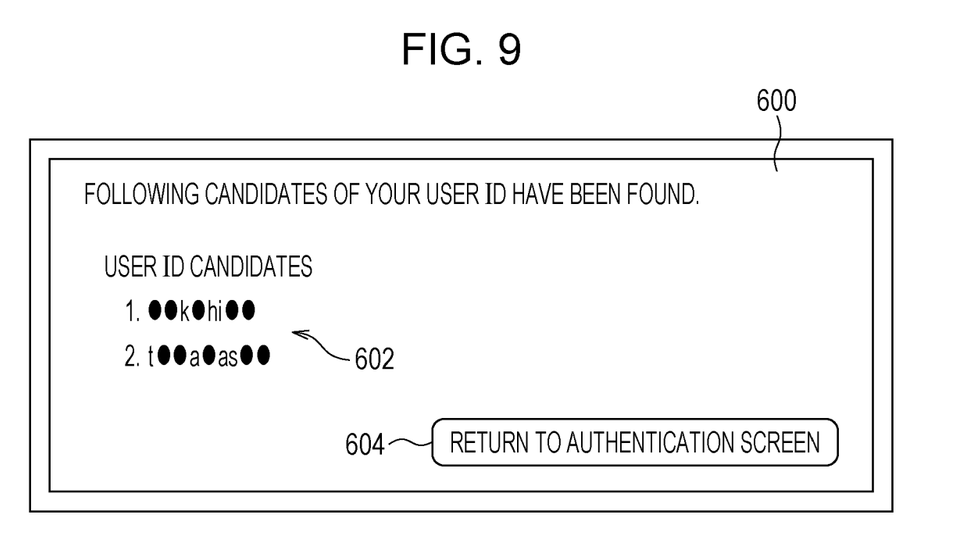
FIG. 9 illustrates an example of a web page showing a clue about a user ID.

The candidate IDs displayed as a list are, for example, arranged in the descending order of matching degree. FIG. 9 illustrates an example of a clue screen 600. In this example, two candidate IDs 602 that are partially masked are displayed.

The target user gets a clue about his or her correct user ID registered in a target system (a linked system 200 which the user tried to log in) from the clue screen 600. Then, the target user calls up an authentication screen for use of the target system by pressing a "RETURN TO AUTHENTICATION SCREEN" button 604 and enters the user ID found from the clue and a corresponding password.

The exemplary embodiment has been described above, but the above exemplary embodiment is merely an example.

For example, on the web page 500 for questions about an operation history illustrated in FIG. 8, a group pf fixed questions that do not depend on specific contents of the operation history is displayed. However, this is merely an example. Alternatively, questions that reflect the contents of the operation history may be presented to the target user. For example, operation names in latest operation history records corresponding to respective candidate IDs in a target system are used as options of a question about the type of a latest operation performed in the target system.

Furthermore, all questions need not be included in a single web page 500. For example, after a user answers to a single web page for questions, a next web page for questions displaying questions that reflect the user's answers may be presented to the user. For example, questions about date and type of a latest operation may be given on the first page, and a question about an operation target of the answered operation may be given on a next page. In this case, operation targets of the operation of the operation type answered on the first page in the target system may be extracted from recent operation history records corresponding to respective candidate IDs, and a page for answering an operation target on which these operation targets are presented as options may be presented.

Furthermore, in the above example, a target user answers to questions about an operation history in a target system (a linked system 200 which the target user failed to log in). However, this is merely an example. Alternatively, questions concerning an operation history in a specific linked system 200 other than the target system may be given. For example, in a case where the target system is a system (e.g., purchase request system) that is rarely used by general users, the number of operation histories of each user is small, and time and date of a user's last operation is sometimes old. In such a case, the user does not remember an operation history in the target system in many cases, and therefore there are cases where the user cannot give a correct answer to a question about an operation in the target system. In view of this, questions about an operation history in a linked system 200 frequently used by general users (e.g., a company's information sharing system that is presumably accessed by users almost every day) may be given in such cases. In this case, operation history records including a common user ID corresponding to each candidate ID among operation history records in the linked system 200 that is frequently used become candidate records, and a matching degree of each candidate record is calculated in accordance with a degree of matching of items of the candidate record with user's answers. Furthermore, the questions are not limited to the ones concerning an operation history in the specific linked system 200, and instead questions about when (operation time and date) and which operation (operation type) was performed on which operation target in which linked system 200 may be given to the user.

Furthermore, in the above example, the authentication system 100 collectively performs user authentication for allowing use of the linked systems 200, and the authentication system 100 includes the clue processing unit 150. However, this system configuration is also merely an example. Alternatively, for example, each of the linked systems 200 authenticates a user who is trying to log in the linked system 200, and if authentication fails, the user is redirected from the linked system 200 to the clue processing unit 150, and the clue processing unit 150 performs the above processing for presenting a clue thereafter. In this case, the linked system 200 may notify the clue processing unit 150 to which the user is redirected about a user ID entered by the user for (failed) authentication, and the clue processing unit 150 may extract a candidate ID on the basis of the notified user ID.

Furthermore, in the above example, candidate IDs related to a user ID used for failed authentication are extracted, and matching degrees of these candidate IDs with user's answers to questions are found. However, this procedure is also merely an example. Instead of extracting candidate IDs in advance, it is also possible to employ a procedure of giving a large number of questions concerning an operation history and then extracting some common user IDs as candidates in the descending order of matching degrees with a combination of answers to the questions. Then, user IDs for a target system (a linked system 200 in which the user failed in authentication) that correspond to the extracted candidate common user IDs are masked in accordance with the matching degrees and are then offered to the user as a clue.

Furthermore, in the above example, user's failure in user authentication for allowing use of a linked system 200 acts as a trigger causing the clue processing unit 150 to start the processing for presenting a clue about a user ID. This is also merely an example. Alternatively, for example, receipt of a user's request for a clue about a user ID for a designated linked system 200 may act as a trigger causing the clue processing unit 150 to start the processing for presenting a clue.

The exemplary embodiment of the present invention has been described above. The authentication system 100 (especially the clue processing unit 150) illustrated above is realized by causing a computer to execute a program representing the above functions of the authentication system 100. The computer has, for example, a circuit configuration in which a microprocessor such as a CPU, a memory (first storage) such as a random access memory (RAM) or a read only memory (ROM), a controller that controls a fixed storage such as a flash memory, a solid state drive (SSD), or a hard disc drive (HDD), various input/output (I/O) interfaces, and a network interface for controlling connection with a network such as a local area network are connected as hardware through a bus or the like. The program describing the processing contents of the functions are stored in the fixed storage such as a flash memory over a network and are installed in the computer. The program stored in the fixed storage is read out into the RAM and is then executed by the microprocessor such as a CPU. In this way, the functional modules illustrated above are realized.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for information processing, the process comprising:
   receiving an entry of information from a requesting user who has requested a clue about user information;
   specifying, from registered users, at least one candidate corresponding to the requesting user in accordance with the received entry of information; and
   controlling a display to display, on a same screen, (i) user information of the specified at least one candidate that is partially masked and (ii) a button for calling up an authentication screen, wherein:
   the authentication screen is a separate screen on which a password corresponding to the user information of the specified at least one candidate is entered, and
   the password is not entered on the screen on which the user information of the specified at least one candidate that is partially masked and the button for calling up the authentication screen are displayed.

2. The non-transitory computer readable medium according to claim 1, wherein
   the specified at least one candidate comprises a plurality of candidates.

3. The non-transitory computer readable medium according to claim 2, wherein the process comprises:
   controlling the display to display the user information of the specified at least one candidate, the specified at least one candidate being only a part of the plurality of candidates.

4. The non-transitory computer readable medium according to claim 3, wherein
   the specified at least one candidate is the part of the plurality of candidates that satisfy a predetermined condition.

5. The non-transitory computer readable medium according to claim 1, wherein
   the user information is user authentication information including user ID.

6. The non-transitory computer readable medium according to claim 1, wherein
   the specifying of the at least one candidate includes specifying a user ID of the at least one candidate; and
   the specified user ID of the at least one candidate is the user information of the specified at least one candidate that is partially masked and displayed on the same screen.

7. The non-transitory computer readable medium according to claim 1, wherein
   the specified at least one candidate includes a plurality of usernames registered for different systems in a linked system, the plurality of usernames being assigned to a common user ID in a user management table for the linked system.

8. The non-transitory computer readable medium according to claim 7, wherein the process further comprises:
determining a number of characters to be masked in a character string of the specified at least one candidate in accordance with a rule that a percentage of masked characters is made lower as a matching degree score of the specified at least one candidate becomes higher, wherein the matching degree score is calculated based on comparison between the received entry of the information and recorded operation histories of the requesting user in the linked system.

9. An information processing apparatus comprising:
a hardware processor programmed to:
receive an entry of information from a requesting user who has requested a clue about user information;
specify, from registered users, at least one candidate corresponding to the requesting user in accordance with the received entry of information; and
control a display to display, on a same screen, (i) user information of the specified at least one candidate that is partially masked and (ii) a button for calling up an authentication screen, wherein:
the authentication screen is a separate screen on which a password corresponding to the user information of the specified at least one candidate is entered, and
the password is not entered on the screen on which the user information of the specified at least one candidate that is partially masked and the button for calling up the authentication screen are displayed.

\* \* \* \* \*